US012694818B1

(12) United States Patent
Burleson et al.

(10) Patent No.: US 12,694,818 B1
(45) Date of Patent: Jul. 28, 2026

(54) E-PAPER COMPLIANCE POSTER SYSTEM AND METHOD

(71) Applicant: J. J. Keller & Associates, Inc., Neenah, WI (US)

(72) Inventors: Benjamin L. Burleson, College Station, TX (US); Paul E. Paulick, Oshkosh, WI (US); Anthony M. Wheel, Oshkosh, WI (US); Joel Clark, Sherwood, WI (US)

(73) Assignees: J. J. Keller & Associates, Inc.; Neenah, Inc.

( * ) Notice: Subject to any disclaimer, the term of this patent is extended or adjusted under 35 U.S.C. 154(b) by 0 days.

(21) Appl. No.: 19/333,778

(22) Filed: Sep. 19, 2025

(51) Int. Cl.
*G09G 3/20* (2006.01)
*G06Q 50/26* (2012.01)
*G09F 9/30* (2006.01)

(52) U.S. Cl.
CPC ........... *G09G 3/2092* (2013.01); *G06Q 50/26* (2013.01); *G09F 9/30* (2013.01); *G09G 2300/026* (2013.01); *G09G 2330/023* (2013.01); *G09G 2330/027* (2013.01); *G09G 2370/02* (2013.01); *G09G 2370/16* (2013.01)

(58) Field of Classification Search
CPC ........... G09G 3/2092; G09G 2300/026; G09G 2330/023; G09G 2330/027; G09G 2370/02; G09G 2370/16; G06Q 50/26; G09F 9/30
See application file for complete search history.

(56) References Cited

U.S. PATENT DOCUMENTS 7,739,510 B2 6/2010 Jung et al.
8,457,013 B2 * 6/2013 Essinger ................ H04W 4/50 370/254
8,621,224 B2 12/2013 Jung et al.
10,810,864 B1 10/2020 Reufer et al.
10,923,043 B2 2/2021 Williams et al.
2007/0030243 A1 2/2007 Ishii
2007/0285385 A1 12/2007 Albert et al.
2008/0262883 A1 * 10/2008 Weiss .................. G06Q 30/018 705/7.42
2015/0379521 A1 * 12/2015 Weiss .............. G06Q 10/06398 705/317

FOREIGN PATENT DOCUMENTS

EP 4575752 6/2025

* cited by examiner

*Primary Examiner* — Pegeman Karimi
(74) *Attorney, Agent, or Firm* — Wong Meyer Smith & McConnell

(57) ABSTRACT

An e-paper poster system and method are disclosed relating to displaying an always compliant poster, such as a labor law poster, at a given location without end user effort. An e-paper display is provided and connected to a network in communication with an information source. At the termination of a sleep cycle, a wake cycle is entered by connecting the e-paper display to the information source to determine if updated poster content to maintain legal compliance is available. If there is no available updated poster content, the sleep cycle is re-entered. If there is available update poster content, an update cycle is entered by sending the updated poster content from the information source to be displayed on the e-paper display to maintain compliance without any required end user effort and then the sleep cycle is re-entered.

8 Claims, 4 Drawing Sheets

E-PAPER COMPLIANCE POSTER SYSTEM AND METHOD

FIELD OF THE INVENTION

The invention relates to an e-paper compliance poster system and method requiring no effort required on the part of an end user to maintain legal compliance.

BACKGROUND OF THE INVENTION

Compliance poster such as labor law posters (LLPs) are postings required to be displayed in workplaces throughout the United States. They inform employees of their federal and state rights within the workplace. Employers can be subject to fines or other penalties if they do not properly display the most up-to-date LLPs for their employees. Frequently, legal updates are made to various state and federal LLPs which require employers to update the displayed LLPs. It can be difficult for employers to know whether or not their displayed LLPs are up to date or if they are out of compliance.

In attempts to solve the problem of LLP compliance, subscription models have been used which allow employers to pay a monthly or annual fee and be sent paper copies of up-to-date LLPs whenever a federal or state law change is made. While this gives employers access to the newest up-to-date compliant LLPs, it stops short of ensuring that the new paper LLPs arrive at their final destination and are displayed. Paper LLPs can also include a QR code that can be scanned by the employer to verify if an LLP is compliant or if an update is needed. However, many employers do not use the scan feature, resulting in employers displaying out-of-date, non-compliant LLPs.

E-paper, a type of electrophoretic display technology, is bistable (black and white e-paper) or multistable (colored e-paper) having two or more states in which it is stable and does not require power to maintain that state. In use, e-paper can hold an image in black-and-white or in color, and the only power required for the display itself is to change the image from one state to another. The advantage of this technology compared with standard display technologies is that it has very low power requirements, especially for cases in which an image remains static for days, weeks, or longer. E-paper is similar to paper, highly readable, viewable without glare, and the displayed content remains clear and undistorted from any angle.

Generic e-paper displays for displaying signage in various environments exist in the marketplace. However, there are no currently available e-paper LLPs that have a connection to a content management database to maintain and update LLPs across all federal/state/local jurisdictions without any required employer effort.

SUMMARY OF THE INVENTION

In one construction, the disclosure provides a method to display always compliant labor law poster content for a given location without end user effort including the steps of providing a low power consumption e-paper display for displaying labor law poster images, a battery in communication with the display, a memory in communication with the display for storing labor law poster images, a controller in communication with the display and the memory, a modem for enabling communication between the controller and a central server, a content management database in communication with the central server, a driver in communication with the memory to transfer labor law poster images from the memory to the display, connecting the controller to a network, connecting the controller to the central server via the network, assigning a federal or state designation based upon the given location; based upon the designation, sending a compliant initial labor law poster image from the content management database to the memory via the modem, transferring the compliant initial labor law poster image to the e-paper display using the driver, displaying the compliant initial labor law poster image on the e-paper display without any required end user effort, entering a sleep cycle for a set time period using the controller, at the termination of the set period of time of the sleep cycle, entering a wake cycle by connecting the controller to the central server via the modem to determine if an updated labor law poster image to maintain legal compliance is available for the designation, if there is no available updated labor law poster image available, re-entering the sleep cycle using the controller and if there is an available updated labor law poster image, entering an update cycle by transferring the updated labor law poster image from the content management database to the memory via the modem, transferring the update labor law poster image to the e-paper display using the driver, displaying the compliant updated labor law poster image on the e-paper display to maintain compliance without any required end user effort and re-entering the sleep cycle using the controller.

In another construction, the disclosure provides a method to display always compliant poster content for a given location without end user effort including the steps of providing an e-paper display system and a content management database, connecting the e-paper display system to a network in communication with an information source, assigning the e-paper display system a federal or state designation based upon the given location, based upon the designation, sending compliant initial poster content from the information source to the e-paper display system, displaying the compliant initial poster content on the e-paper display system without any required end user effort, entering a sleep cycle for a set time period, at the termination of the sleep cycle, entering a wake cycle by connecting the e-paper display system to the information source to determine if updated poster content to maintain legal compliance is available for the designation, if there is no available updated poster content, re-entering the sleep cycle and if there is available updated poster content, entering an update cycle by sending the updated poster content from the information source to be displayed on the e-paper display system to maintain compliance without any required end user effort and then re-entering the sleep cycle.

In another construction, the disclosure provides an e-paper compliance poster system requiring no end user effort to maintain compliant poster content. The system including an e-paper display for displaying poster content for a given location, the display having a sleep cycle of a set time period, a power source in communication with the display, a memory in communication with the display for storing poster content, a controller in communication with the display and the memory, an information source for determining whether updated poster content is available, a modem to enable communication between the controller and the information source and a driver in communication with the memory to transfer poster content to the display, wherein after the set period of time of the sleep cycle, if the information source has determined there is updated poster content available for the given location, compliant updated poster content is communicated via the modem to the memory and then to the driver for display on the e-paper display without requiring any end user effort and wherein after the set period of time of the sleep cycle, if the information source has determined there is no updated poster content available for the given location, the sleep cycle is restarted.

Other aspects of the disclosure will become apparent by consideration of the detailed description and accompanying drawings.

DETAILED DESCRIPTION OF THE INVENTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

The present invention is an e-paper compliance poster system and method where no effort is required on the part of an end user to ensure and maintain poster compliance. The most up-to-date compliant poster is automatically displayed, all without the end user having to interact with the poster or any other source. A battery eliminates the need for the e-paper compliance poster system to be plugged into a power source and has the capacity to support the power required for use over the lifetime of the e-paper LLP system. An e-paper display is utilized due to its image quality being similar to paper and its ability to hold an image without any power. The use of a battery using a low-power/no-power e-paper display technology ensures the most up-to-date complaint poster is always displayed at a specific location through communication with a central server and content management database which can push out updated compliant poster as they become available.

The poster compliance system and method are described hereafter with respect to a labor law poster (LLP). However, it should be noted that any other types of compliance posters that are required to be display can be utilized with the invention.

Figure 1:
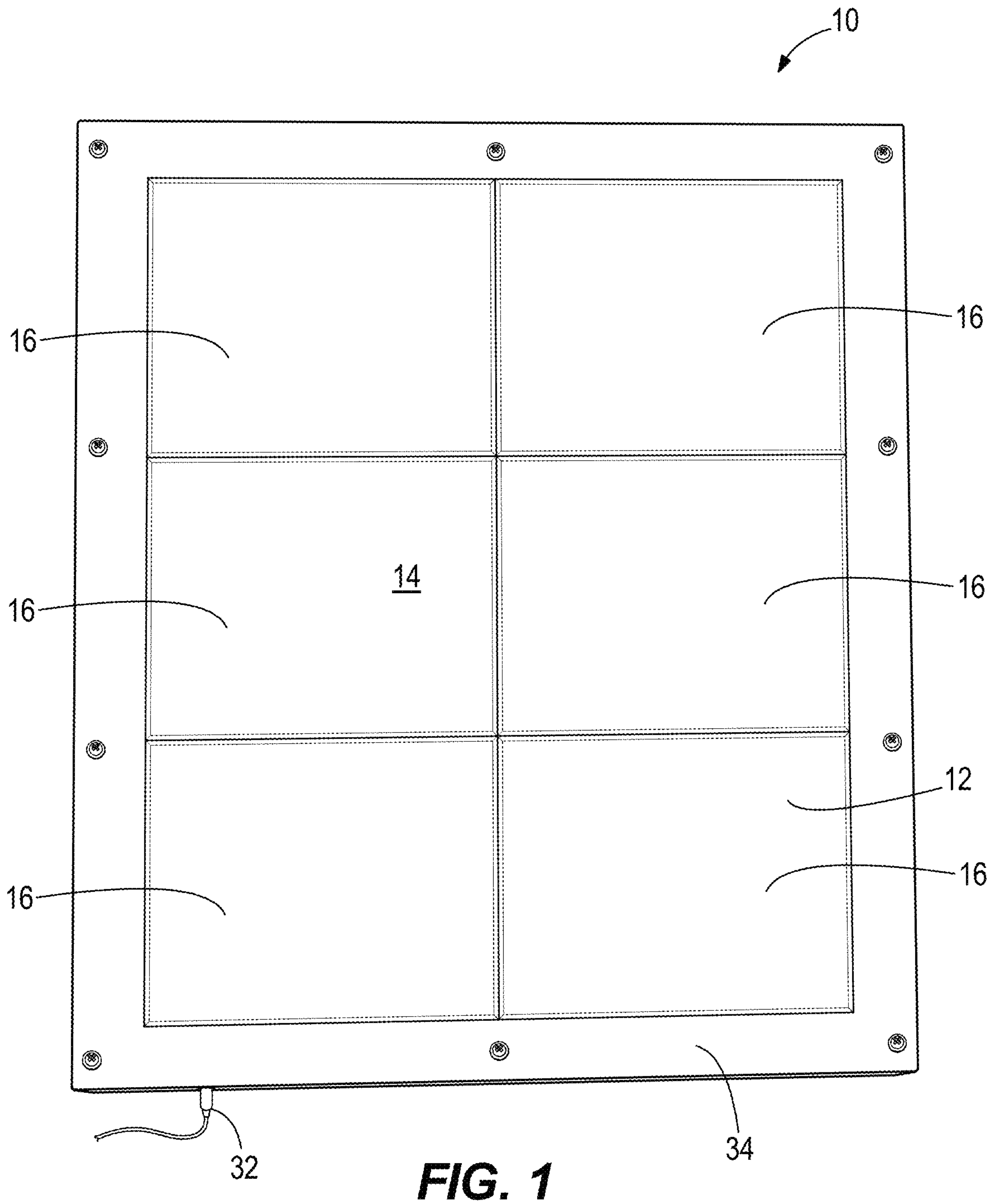
FIG. 1 is a top plan view of an e-paper LLP system.
Figure 2:
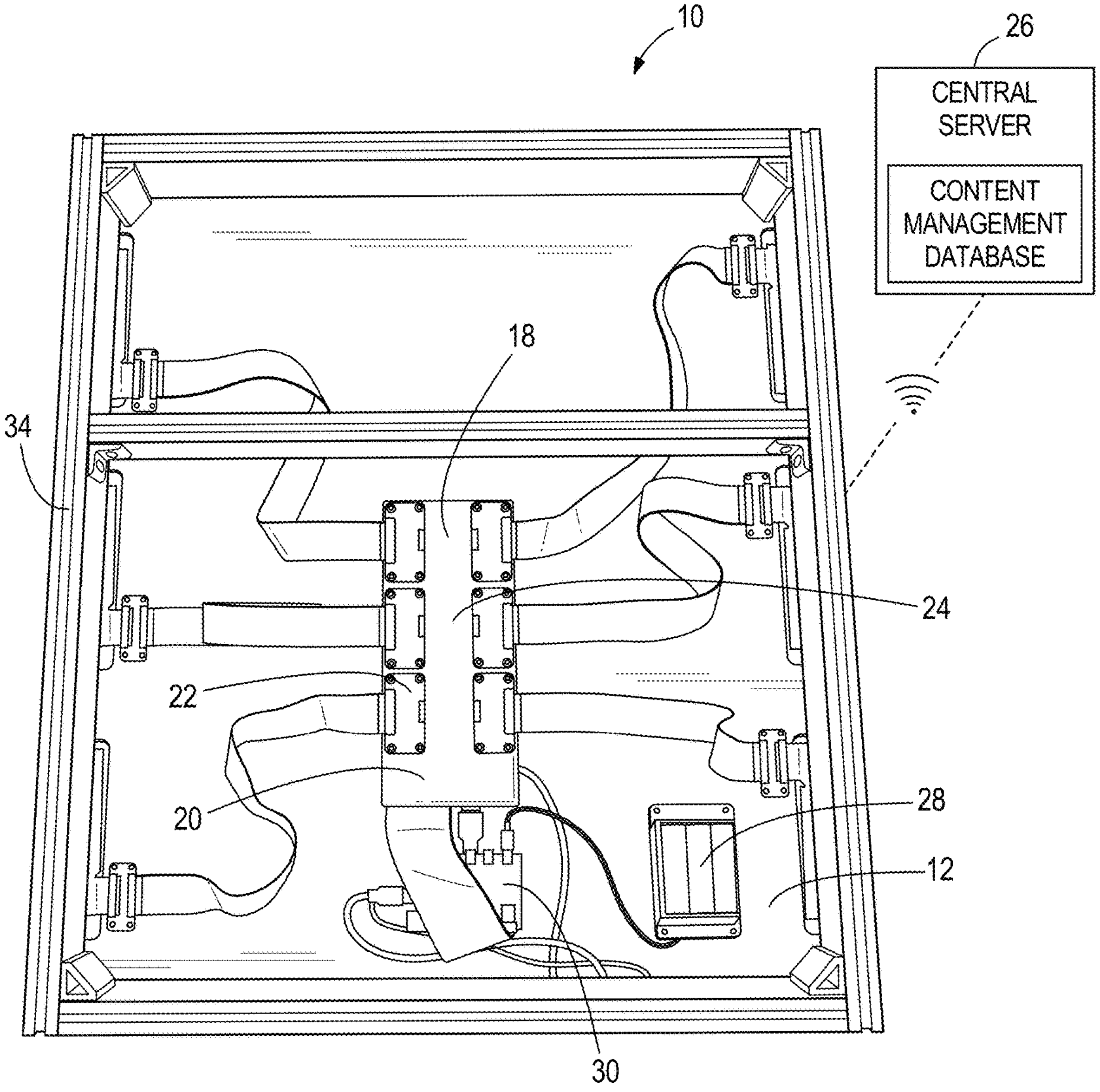
FIG. 2 is a rear plan view of the e-paper LLP system.
Figure 3:
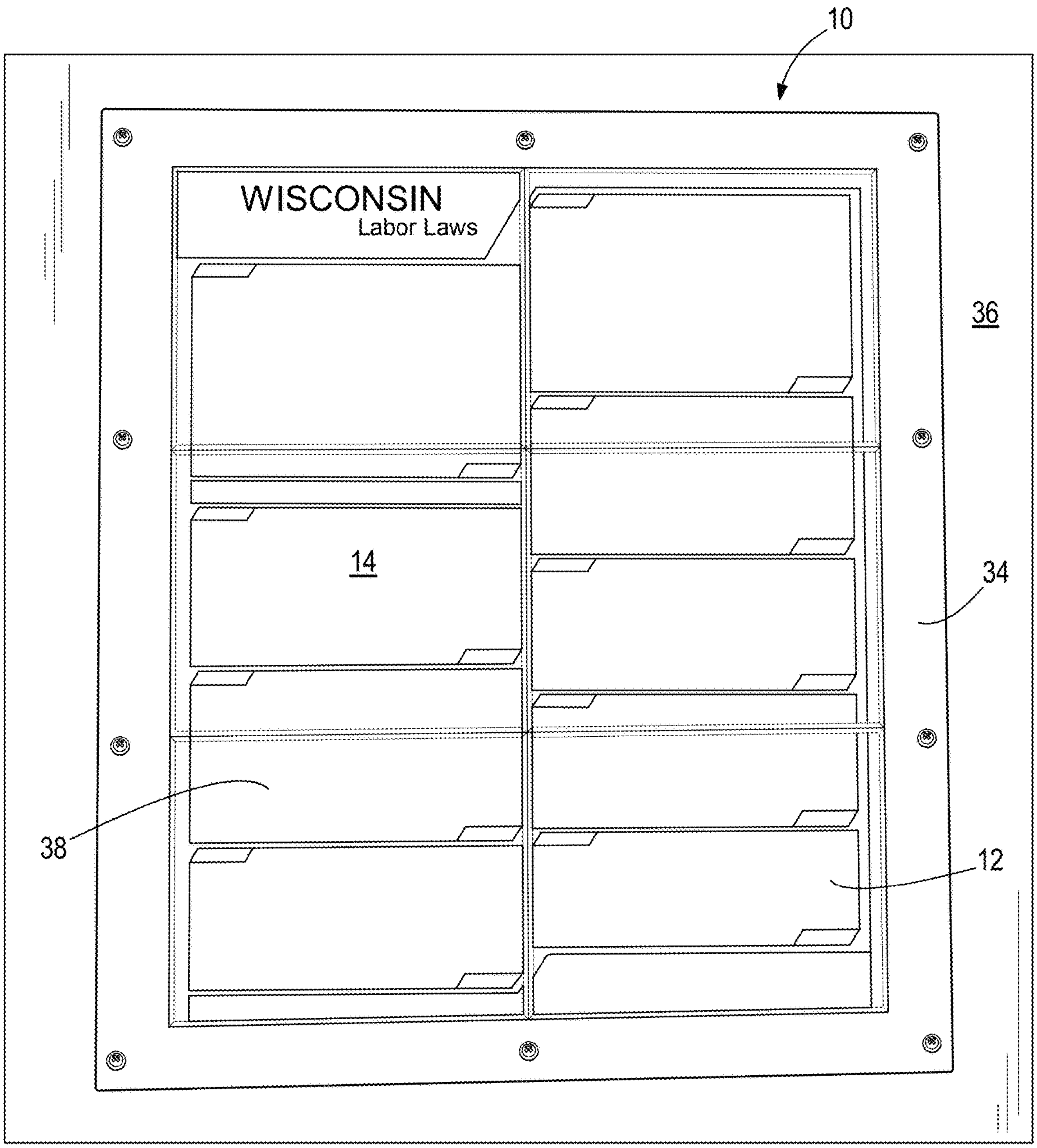
FIG. 3 is a front plan view of the e-paper LLP system displaying an LLP and secured to a surface.

With reference to FIG. 1-3, the invention is shown and includes an e-paper LLP system 10. An e-paper display 12 is utilized having a display area 14, such as the depicted six individual panels 16 that are configured for a display area of 20"×24" for example. It should be noted that other numbers of panels, other configurations and other display area sizes can be utilized as well as multiple e-paper displays. An example of a suitable e-paper display is model ED2208-NCA available from E Ink Holdings Inc.

As specifically shown in FIG. 2, the e-paper LLP system 10 includes multiple electronic hardware subsystems as follows. Driving hardware 18 turns on/off the individual panels 16 and pushes images and content to be displayed to the panels 16. Onboard memory 20 holds the images and content to be displayed. A controller 22 such as a processor integrates and controls all of the peripheral electronic hardware, prompts the e-paper LLP system 10 to check for new updated LLP files, controls the images and content to be displayed and controls sleep and wake cycles as will be discussed below. A wireless modem 24 enables connectivity to an information source such as a server and content management database 26 which determines whether the LLP displayed is up-to-date and complaint or whether a new update has been issued. Other software and/or hardware can be used as the information source and provide the same functionality as the central server and content management database 26 such as an external memory device, an application connected via Bluetooth or Wi-Fi and similar method and devices as are known to those of skill in the art.

If there is a new update, files are downloaded into the memory 20. A battery 28 is included as well as power circuitry 30 that monitors the state-of-charge of the battery 28 to ensure that stable power is distributed to all panels 16. The battery 28 eliminates the need for the e-paper LLP system 10 to be plugged into a power source and has the capacity to support the power requirements of the e-paper LLP system over its typical lifespan. A charging port 32 can optionally be included to recharge the battery 28, if needed.

All of the electronic hardware subsystems are housed in a frame 34 that protects the subsystems and allows the e-paper LLP system 10 to be secured to a surface 36 for viewing an LLP 38 as shown in FIG. 3.

Figure 4:
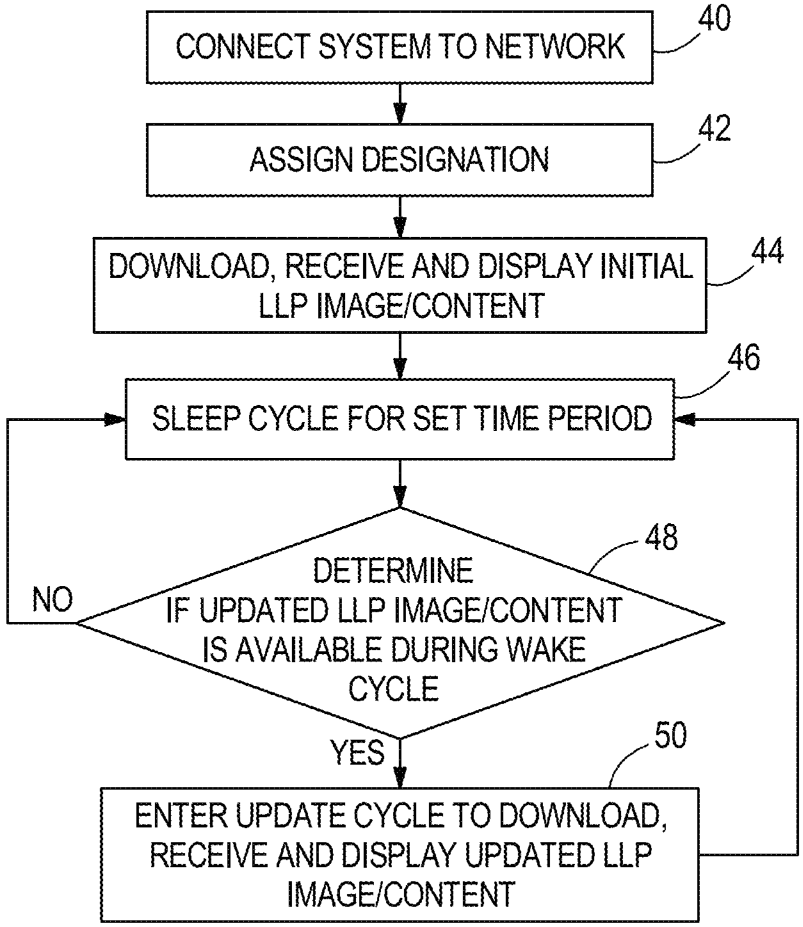
FIG. 4 is a flowchart of an operation of the e-paper LLP system.

With reference to FIG. 4, the operation of the e-paper LLP system 10 is shown. The e-paper LLP system 10 is first connected to a network at step 40 such as a Wi-Fi or cellular network. Alternate methods of connection can be utilized depending upon end user preferences, such as USB/flash drive or interfacing with an application and paired cellphone.

At step 42, using the modem 24, the e-paper LLP system 10 connects to the central server and content management database 26 and is assigned a federal and/or state designation based upon its given location. After receiving its assigned designation, at step 44, the e-paper LLP system 10 downloads, receives and displays on the display 12 an initial labor law poster image. The e-paper LLP system 10 thereafter goes into a sleep cycle at step 46 for a set time period such as weeks or a month consuming almost no power from the battery 28 other than very minimal trickle power where the current consumption is on the microamp/nanoamp level. It should be noted that other time periods can also be utilized.

At the termination of the sleep cycle set time period, at step 48, the e-paper LLP system 10 goes through a wake cycle by reconnecting to the central server and content management database 26 to check if a new LLP update has been published. If there is no update, the e-paper LLP system 10 will go back into the sleep cycle with almost no power consumption from the battery 28 other than very minimal trickle power where the current consumption is on the microamp/nanoamp level. The time the e-paper LLP system is in its wake cycle is, for example, less than five minutes and often 1-3 minutes and therefore consumes a small amount of battery power.

If updated labor poster images or content are available for the assigned designation, at step 50, the e-paper LLP system 10 enters an update cycle, will download the new LLP files from the central server and content management database 26 and store them locally in the memory 20. The new LLP files are then pulled from the memory 10 by the driver 18 and the images or content 38 are displayed on the display 12 as shown in FIG. 3. Thereafter, the e-paper LLP system 10 will enter the sleep cycle again in step 46 and wake again after the set time period has elapsed. The updating cycle takes approximately 15 minutes for example.

If the e-paper LLP system 10 does not receive an update for a longer time period such as three months, the e-paper LLP system 10 can optionally perform a maintenance cycle whereby the e-paper LLP system 10 goes through the update cycle for the current posting. This can be done to maintain the longevity and/or clarity of the display 12.

The e-paper LLP system 10 has the ability to retroactively determine that a specific LLP posting was in fact displayed at a certain timestamp to confirm and/or prove compliance if necessary.

The e-paper LLP system 10 can deliver customized LLP content to a specific end user such as including end user logos or employee messaging.

The e-paper LLP system 10 can include the ability to automatically generate content for form-fillable fields for certain state postings that require end users to fill out fields.

Figure 5:
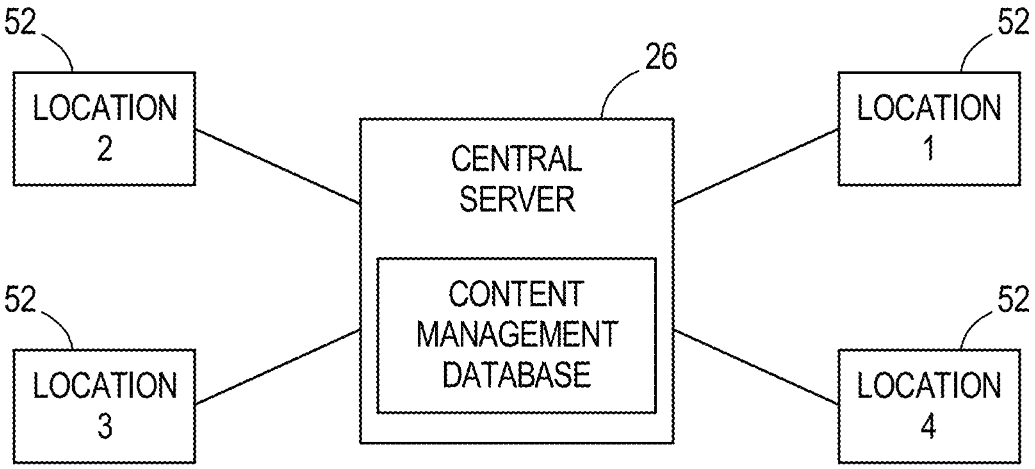
FIG. 5 is a schematic of a subscription system using the e-paper LLP system.

Turning to FIG. 5, there is shown the use of the invention for multiple employers, for a single employer with multiple locations, or for both. Four locations 52 needing complaint LLPs without employer effort are shown, however, any number of locations 52 can be used with a single central server and content management database 26. For example, locations 52 can be different LLP posting locations for a single employer. For example, locations 52 can be different employers with LLP postings needs. For example, multiple locations 52 for a first employer and multiple locations 52 for a second employer can also be serviced. Different numbers of locations/employers can be utilized as needed, all being serviced using the central server and content management database 26 to maintain LLP compliance without employer(s) effort.

Various features and advantages of the invention are set forth in the following claims.

What is claimed is:

1. A method to display always compliant labor law poster content for a given location without end user effort, the method comprising the steps of:

providing a low power consumption e-paper display for displaying labor law poster images, a battery in communication with the display, a memory in communication with the display for storing labor law poster images, a controller in communication with the display and the memory, a modem for enabling communication between the controller and a central server, a content management database in communication with the central server, a driver in communication with the memory to transfer labor law poster images from the memory to the display;

connecting the controller to a network;

connecting the controller to the central server via the network;

assigning a federal or state designation based upon the given location;

based upon the designation, sending a compliant initial labor law poster image from the content management database to the memory via the modem;

transferring the compliant initial labor law poster image to the e-paper display using the driver;

displaying the compliant initial labor law poster image on the e-paper display without any required end user effort;

entering a sleep cycle for a set time period using the controller;

at the termination of the set period of time of the sleep cycle, entering a wake cycle by connecting the controller to the central server via the modem to determine if an updated labor law poster image to maintain legal compliance is available for the designation;

if there is no available updated labor law poster image available, re-entering the sleep cycle using the controller; and if there is an available updated labor law poster image, entering an update cycle by transferring the updated labor law poster image from the content management database to the memory via the modem, transferring the update labor law poster image to the e-paper display using the driver, displaying the compliant updated labor law poster image on the e-paper display to maintain compliance without any required end user effort and re-entering the sleep cycle using the controller.

2. A method to display always compliant poster content for a given location without end user effort, the method comprising the steps of:

providing an e-paper display system and a content management database;

connecting the e-paper display system to a network in communication with an information source;

assigning the e-paper display system a federal or state designation based upon the given location;

based upon the designation, sending compliant initial poster content from the information source to the e-paper display system;

displaying the compliant initial poster content on the e-paper display system without any required end user effort;

entering a sleep cycle for a set time period;

at the termination of the sleep cycle, entering a wake cycle by connecting the e-paper display system to the information source to determine if updated poster content to maintain legal compliance is available for the designation;

if there is no available updated poster content, re-entering the sleep cycle; and if there is available updated poster content, entering an update cycle by sending the updated poster content from the information source to be displayed on the e-paper display system to maintain compliance without any required end user effort and then re-entering the sleep cycle.

3. The method of claim 2 wherein the wake cycle is less than five minutes.

4. The method of claim 2 wherein the e-paper display system includes a battery as the only power source.

5. The method of claim 2 wherein the e-paper display system includes between one and six panels.

6. The method of claim 2 and further including the step of providing end user customized content to the e-paper display system.

7. The method of claim 2 and further including the step of retroactively proving end user compliance.

8. An e-paper compliance poster system requiring no end user effort to maintain compliant poster content, the system comprising:

an e-paper display for displaying poster content for a given location, the display having a sleep cycle of a set time period;

a power source in communication with the display;

a memory in communication with the display for storing poster content;

a controller in communication with the display and the memory;

an information source for determining whether updated poster content is available;

a modem to enable communication between the controller and the information source; and a driver in communication with the memory to transfer poster content to the display;

wherein after the set period of time of the sleep cycle, if the information source has determined there is updated poster content available for the given location, compliant updated poster content is communicated via the modem to the memory and then to the driver for display on the e-paper display without requiring any end user effort; and wherein after the set period of time of the sleep cycle, if the information source has determined there is no updated poster content available for the given location, the sleep cycle is restarted.

* * * * *